United States Patent [19]

Baylis et al.

[11] 4,393,046

[45] Jul. 12, 1983

[54] COMBINATION OF THIOPEPTIN AND OTHER RELATED SULFUR-CONTAINING CYCLIC POLYPEPTIDE ANTIBIOTICS WITH RUMEN-ACTIVE DIIMIDES TO IMPROVE RUMINANT FEED EFFICIENCY

[75] Inventors: Francis P. Baylis, Greenbrook, N.J.; Gary E. Smith, Vale, Oreg.

[73] Assignee: Merck & Co., Inc., Rahway, N.J.

[21] Appl. No.: 229,806

[22] Filed: Jan. 30, 1981

[51] Int. Cl.³ .................... A23K 1/16; A23K 1/17; A61K 31/40; A61K 47/00
[52] U.S. Cl. .................... 424/117; 424/274; 426/2
[58] Field of Search .................... 424/117, 274; 426/2

[56] References Cited

U.S. PATENT DOCUMENTS

| | | | |
|---|---|---|---|
| 3,761,587 | 9/1973 | Miyairi et al. | 424/117 |
| 3,790,668 | 2/1974 | Raun | 424/117 |
| 4,061,732 | 12/1977 | Muir et al. | 424/117 |
| 4,212,880 | 7/1980 | Fisher et al. | 424/117 |

FOREIGN PATENT DOCUMENTS 10440 4/1980 European Pat. Off. .

Primary Examiner—Anna P. Fagelson
Attorney, Agent, or Firm—David L. Rose; Mario A. Monaco

[57] ABSTRACT

Combinations of thiopeptin or one of its analogs with a pyromellitic diimide are shown to synergistically increase the feed efficiency of economically important ruminant animals, especially cattle, sheep, and goats.

4 Claims, No Drawings

COMBINATION OF THIOPEPTIN AND OTHER RELATED SULFUR-CONTAINING CYCLIC POLYPEPTIDE ANTIBIOTICS WITH RUMEN-ACTIVE DIIMIDES TO IMPROVE RUMINANT FEED EFFICIENCY

BACKGROUND OF THE INVENTION

In the course of investigating the efficiency of feed use, the mechanism by which cattle, sheep and other ruminants digest and degrade the components of their feed to form metabolities has been intensively studied. The mechanism of carbohydrate metabolism is well known. Microorganisms in the rumen of the animal ferment ingested carbohydrates to produce monosaccharides which in turn are degraded to pyruvate derivatives.

The pyruvates in turn are metabolized to either an acetate or a propionate which may exist as acids, salts, or other radicals. Butyrates are usually formed from two acetate radicals.

The animal can utlize butyrate, propionate, and acetate with differing degrees of efficiency. Utilization of these compounds, which are collectively known as volatile fatty acids (VFA), occurs after absorption from the gut of the animal. Butyrate is utilized most efficiently, and acetate the least efficiently. However, the overall efficiency of utilizing butyrate is lower than that of propionate, because extra energy is consumed during the formation of butyrate from two acetate molecules.

Generally, it is established that the higher the efficiency of carbohydrate utilization, the higher the feed efficiency. In other words, the feed efficiency can be effectively monitored by observing the production and concentration of propionate in the rumen. If the animal is generating more propionate in its rumen, it will be found to be utilizing its feed more efficiently.

This invention relates to the combination of thiopeptin or other related sulfur-containing cyclic polypeptides with a pyromellitic diimide. When the two compounds are combined and administered to ruminants, a synergistically favorable shift in "ruminal parameters" is observed which represents an improved feed efficiency. "Ruminal parameters" generally refers to the volatile fatty acid (VFA) content of the animal rumen, the methane gas content, and the total gas content. As discussed above, a shift of VFA to higher propionate content and lower acetate-methane contents indicate a higher feed efficiency. For the novel combination of the present invention, the favorable shift is found to be surprisingly greater than the mere sum of the corresponding individual shifts, i.e., the shift caused by the combination is greater than the sum of the shifts when the individual compound is fed alone to the animals.

SUMMARY OF THE INVENTION

The present invention relates to the effect of combinations of thiopeptin and other related sulfur-containing cyclic polypeptide antibiotics with rumen-active diimides on the feed efficiency of ruminants. The other sulfur-containing cyclic polypeptide antibiotics include thiostrepton, siomycin, and the like. Thiopeptin is particularly effective and is isolated from the fermentation broth of *Streptomyces tateyamensis*. The antibiotic is disclosed in U.S. Pat. No. 3,761,587 to Miyari et al. along with the preparation thereof by microbiological fermentation. The compound is described as having utility as a growth permittent, particularly in fowl and swine. Thiopeptin is also described in U.S. Pat. No. 4,061,732 to Muir et al. as having utility in the prevention of lactic acidosis, a digestive disorder in ruminants.

Pyromellitic diimides are best described in the following structural formula:

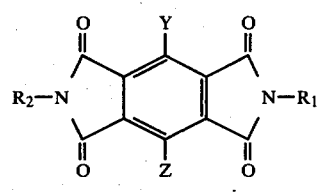

wherein
$R_1$ and $R_2$ are independently hydrogen, lower alkyl, or hydroxy or thio substituted lower alkyl;
Y and Z are independently hydrogen, halogen or lower alkyl.

The term "lower alkyl" is intended to include those alkyl groups of from 1 to 6 carbon atoms in either a straight or branched configuration. Exemplary of such groups are methyl, ethyl, propyl, isopropyl, butyl, sec-butyl, tert-butyl, pentyl, isopentyl, hexyl, and the like.

The preferred diimides to be used in this invention are realized in the above structural formula when $R_1$ and $R_2$ are independently hydrogen, methyl, ethyl, thioethyl or hydroxyethyl; and Y and Z are hydrogen.

The most preferred diimides are selected from the following compounds:

(1) pyromellitic diimide;
(2) N,N'-bis(2-hydroxyethyl)pyromellitic diimide;
(3) N-(2-hydroxyethyl)pyromellitic diimide;
and
(4) N-(2-methylthioethyl)pyromellitic diimide.

The diimides are known compounds. Compounds (1) and (2) are disclosed in U.S. Pat. No. 4,212,880 issued to Fisher et al. on July 15, 1980, and compounds (3) and (4) are disclosed in European patent application, publication No. 0,010,440, Apr. 30, 1980. Both groups of diimides are found to be useful in the improvement of feed efficiency of ruminants.

Accordingly, it is an object of this invention to (1) provide for a novel, synergistic, combination of thiopeptin or a related sulfur-containing cyclic polypeptide antibiotic with a substituted pyromellitic diimide, useful in improving feed efficiency of ruminants; (2) provide for a method for the oral administration of the novel combination; and (3) to provide for compositions containing such a novel combination for oral administration to ruminants.

DETAILED DESCRIPTION OF THE INVENTION

The synergistic effect of the combination of thiopeptin and a pyromellitic diimide derivative has been observed by administering the two compounds to ruminants on a controlled diet and taking periodic samples of rumen fluid. The amount of each of the volatile fatty acids present in the rumen fluid is measured and compared with that of animals taking no medication and also with animals given only one of the two compounds.

Specifically, as shown below in Tables I and II, significant improvements in ruminal parameters are effected by the addition of thiopeptin to N-(2-hydroxyethyl)pyromellitic diimide, or N,N'-bis-(2-hydroxyethyl)pyromellitic diimide.

TABLE I

CHANGES IN RUMINAL VFA AND METHANE FROM CONTROL VALUES OF SHEEP FED PYROMELLITIC DIIMIDE OR N—(2-HYDROXYETHYL)PYROMELLITIC DIIMIDE ALONE AND IN COMBINATION WITH TRIOPEPTIN AS RUMEN ADDITIVES, SH-225

| Treatment | Drug Level % | VFA, % Change Acetate | VFA, % Change pro-pionate | Methane Inhibition % |
|---|---|---|---|---|
| Thiopeptin | 0.001 | −1.2 | +10.5 | 6 |
|  | 0.002 | −4.1 | +18.0 | 13 |
| pyromellitic diimide (PD) | 0.005 | −7.4 | +11.0 | 38 |
| PD + thiopeptin | 0.005 + 0.001 | −16.9 | +56.5 | 63 |
|  | 0.005 + 0.002 | −15.9 | +61.5 | 81 |
| N—(2-hydroxyethyl)pyromellitic diimide (HEPD) | 0.0025 | −0.6 | −3.5 | 0 |
| HEPD + thiopeptin | 0.0025 + 0.001 | −6.7 | +25.5 | 13 |
|  | 0.0025 + 0.002 | −5.0 | +21.5 | 0 |
| HEPD | 0.005 | −4.4 | +2.0 | 13 |
| HEPD + thiopeptin | 0.005 + 0.001 | −12.2 | +41.5 | 25 |
|  | 0.005 + 0.002 | −13.8 | +53.5 | 38 |

TABLE II

Changes in Ruminal VFA and Methane from Control Values of Sheep Fed N,N'—Bis(2-Hydroxyethyl)Pyromellitic Diimide Alone and In Combination with Thiopeptin as Rumen Additives, SH-232

| Treatment | Drug Level % of Diet | VFA, % Change Acetate | VFA, % Change Propionate | Methane Inhibition % |
|---|---|---|---|---|
| Thiopeptin | 0.001 | −2.8 | +10.0 | 6 |
| N,N'—bis-2-hydroxyethyl)-pyromellitic diimide (BHEPD) | 0.005 | −1.2 | −2.4 | —[a] |
| BHEPD + thiopeptin | 0.005 + 0.001 | −8.0 | +24.4 | 19 |

[a] A 6% increase in methane production was observed.

The method of improving the feed utilization of ruminants of this invention comprises orally administering to a ruminant an effective amount of a combination of thiopeptin or its analog with a pyromellitic diimide. The most economically important ruminant animals are cattle, sheep and goats. The compounds of this invention are administered to ruminants orally generally via the feed, at rates of from about 1 to 100 grams per ton (about 0.0001% to 0.01% by weight) of thiopeptin or its analog and from about 1 to 200 grams per ton (about 0.0001% to 0.02% by weight) of one of the pyromellitic diimides, preferably from about 5–20 grams per ton (about 0.0005% to 0.002% by weight) of thiopeptin or its analog and from about 10–30 grams per ton (about 0.001% to about 0.003% by weight) of one of the pyromellitic diimides. The easiest way to administer the compounds is by mixing them in the animal's feed. Other efficient methods of administration include incorporation of the compounds into dosage forms of tablets, drenches, boluses, capsules, or the like. Formulation of the compounds in such dosage forms can be accomplished by methods well known in the field of veterinary pharmacy. Each individual dosage unit should contain a sufficient amount of the combination of feed-efficiency-improving compounds which has a direct relation to the proper daily dose for the animal to be treated.

Capsules are readily produced by filling gelatin capsules with any desired form of the compounds. If desired, the compounds can be diluted with an inert substance, such as powdered sugar, starch or purified crystalline cellulose, in order to increase its volume for convenience in filling the capsules.

Tablets of the compounds useful in this novel method are made by conventional pharmaceutical processes. Manufacture of tablets is a well-known and highly-advanced art. In addition to the active ingredient, a tablet usually contains a base, a disintegrator, an absorbent, a binder, and a lubricant. Typical bases include lactose, fine icing sugar, sodium chloride, starch and mannitol. Starch is also a good disintegrator as is alginic acid. Sometimes surface active agents such as sodium lauryl sulfate and dioctyl sodium sulfosuccinate are also used. Commonly used absorbents include starch and lactose. For oily substances, magnesium carbonate is preferred. Frequently used binders are gelatin, gums, starch, dextin and various cellulose derivatives. Among the commonly used lubricants are magnesium stearate, talc, paraffin wax, various metallic soaps, and polyethylene glycol.

A slightly modified method of administration involves time-release boluses. Such boluses are made as tablets are made, except that a means to delay the dissolution of the compound is provided. Boluses are made to release for lengthy periods. The slow dissolution is assisted by choosing a highly water-insoluble form of the compound. A substance such as iron filings is added to raise the density of the bolus and keep it static on the bottom of the rumen.

Dissolution of the compounds is delayed by use of a matrix of insoluble materials in which the drug is embedded. For example, substances such as vegetable waxes, pruified mineral waxes and other water insoluble polymeric materials.

Drenches of the instant compounds are prepared most easily by choosing a water soluble or water dispersable form of the compound. If an insoluble form is desired for some reason, a suspension may be made. Alternatively, a drench may be formulated as a solution in a physiologically acceptable solvent such as a polyethylene glycol.

Suspension of insoluble forms of the compounds can be prepared in vegetable oils such as peanut, corn, or sesame oil; in a glycol such as propylene glycol or a polyethylene glycol; or in water.

Suitable physiologically acceptable adjuvants are necessary in order to keep the compounds suspended. The adjuvants can be chosen from among the thickeners, such as carboxymethylcellulose, polyvinylpyrrolidone, gelatin and aliginates. Many classes of surfactants also may serve to preserve the suspension. For example, lecithin, alkylphenol polyethylene oxide adducts, naphthalene sulfonates, alkylbenzenesulfonates and the polyoxyethylene sorbitan esters are useful for making suspension in liquid nonsolvents.

In addition, many substances which affect the hydrophilicity, density, and surface tension of the liquid can facilitate suspensions in individual cases. For example, silicone antifoams, glycols, sorbitol, and sugars can be useful suspending agents.

The compounds may be offered to the animal grower as a suspension, or as a dry mixture of the compounds and adjuvants to be diluted before use.

These compounds may also be administered in the drinking water of the ruminants. Incorporation into drinking water is performed by adding a water soluble or water suspendable form of desired compound to the water in the proper amount. Formulation of the compound for addition to drinking water follows the same principles as formulation of drenches.

The most practical way to treat animals with the novel method of the present invention is to formulate the combination of compounds into the feed. Any type of feed may be medicated with the present combinations of compounds, including common dry feeds, liquid feeds, and pelleted feeds.

The methods of formulating drugs into animal feeds are well known. The usual practice is to make a concentrated drug premix as a raw material for medicated feeds. A typical drug premix may contain from about 1 to about 400 g. of drug per pound (454 g.) of the premix. The wide range results from the wide range of concentration of drug which may be desired in the final feed. Premixes may be either liquid or solid.

Other ruminant formulations which are normally used are entirely appropriate for manufacturing feeds containing the synergistic combination of compounds in the present invention.

It is not intended that the scope of this invention be limited to any particular formulations or methods of administration. The invention is a method of increasing the efficiency of feed utilization of ruminant animals by the oral administration of certain compounds regardless of the specific method used to administer the combination of compounds.

It is usual to treat economic animals, including ruminants, with a variety of growth promoters, disease preventives, and disease treatments throughout their lives. Such drugs are often used in combination. The novel method may be practiced in combination with other treatments.

The following examples illustrate the methods and materials of the present invention.

EXAMPLE 1

Preparation of Feed Rations

| Ingredients (% by weight) | Ration A (high roughage) | Ration B (high grain) | Ration C (basal) |
|---|---|---|---|
| Alfalfa hay | 77.0 | 14.0 | 95.0 |
| Steamed flaked milo | 14.0 | 75.0 | 0 |
| Molasses | 6.0 | 6.0 | 2.5 |
| Supplement (a) | 0 | 2.0 | 0 |
| Drug Carrier (b) | 0.03-0.3 | 0.03-0.3 | 0 |
| Water | 0 | 0 | 2.5 |

| (a) Supplement Ingredients | % by weight |
|---|---|
| Ammonium Sulfate | 25.0 |
| Urea | 6.2 |
| Limestone | 34.6 |
| Salt | 33.2 |
| Trace Mineral | 0.5 |
| Vitamin A (10 million IU/454 g) | 0.5 |

| (b) Drug Carrier Ingredients | % by weight |
|---|---|
| Corn meal | 91.36 |
| Thiopeptin in dried mycellial cake (0.35% thiopeptin) | 7.81 |
| Pyromellitic diimide concentrate (30 g. pyromellitic diimide per 454 g of concentrate) | 0.83 |

The foregoing finished feed ration will provide medication at the level of about 0.00075% to about 0.0075% by weight of thiopeptin and about 0.0015% to about 0.015% by weight of pyromellitic diimide.

EXAMPLE 2

The Effect of Combinations of Thiopeptin and Pyromellitic diimide as rumen addive compounds on ovine rumen fermentation Forty crossbred lambs are housed two per pen, administered anthelmintic medication (cambendazole/rafoxamide paste, Merck & Co., Inc.) and adapted to basal ration (ration C) before being fed the medicated ration (ration A or B) ad libitum for 14 days. Rumen fluid samples are taken by stomach tube prior to receiving the medicated ration and subsequently at 3, 7, 10 and 14 days on drug. Five ml of strained rumen fluid are immediately added to 1 ml of 25% v/v metaphosphoric acid solution. After being allowed to stand for about 2 hrs, the samples are centrifuged at $20,000 \times g$ for 30 min and the supernatant analyzed for VFA by gas chromatography using a column packed with 20% diethylene glycol adipate plus 2% $H_3PO_4$ on 60/80 Chromasorb W-AW (Supelco, Inc.). The method is essentially the same as described by Erwin, E. S., G. J. Marco and E. W. Emery (1961). *Journal of Dairy Science*, 44, 1768 (1961).

Methane is measured indirectly by fermenting 3.5 ml fresh, strained rumen fluid with 100 g finely grown basal diet and 0.5 ml buffer solution at about pH 7 in a tube sealed with a butyl rubber stopper. The air of the tube is replaced with oxygen-free nitrogen. After incubation at 39° C. for 18 hrs, a sample of the gas is removed through the stopper using a Hamilton gas syringe and partitioned in a Fisher Gas Partioner. The methane produced is compared to a standard gas mixture containing a known amount of methane.

The results are similar to those summarized in Table III of Example 3.

EXAMPLE 3

The effect of combination of thiopeptin and N-(2-hydroxyethyl)pyromellitic diimide (HEPD) as rumen additive compounds on ovine rumen fermentation.

Step 1: Animal handling

Forty crossbred ewe lambs (weighing 21–32 kg) are maintained two to a pen and are adapted to ad libitum feeding of ground alfalfa containing 2.5% molasses and 2.5% water (basal feed ration). Water is supplied ad libitum.

Four sheep are assigned to each of ten treatment groups. The control and medicated diets are fed ad libitum for 7 days. Feed intake is monitored daily. Rumen fluid samples were taken by stomach tube at 0 and 7 days on drug.

Step 2: Mixing of experimental rations

A solution of 50% molasses in water (5 kg) is divided into two approximately equal portions. Thiopeptin and N-(2-hydroxyethyl)pyromellitic diimide (HEPD) are slurried into one of the portions and the resulting mixture is sprayed with mixing onto a 95 kg of ground alfalfa while mixing the feed (the level of thiopeptin is 0.001%; and the level of HEPD is 0.005%). The second portion of the aqueous molasses is used to rinse the slurry container and is subsequently sprayed onto the feed. The total feed and molasses are then mixed in a mixer for an additional 20 min.

Step 3: VFA analysis

The rumen fluid was analyzed for acetic, propionic, butyric and valeric acids on a Varian 1400 gas chromatograph according to the procedures described in Example 2. The results are summarized in Table III.

TABLE III

MEAN RUMINAL PARAMETERS OF SHEEP FED PYROMELLITIC DIIMIDE DERIVATIVES IN COMBINATION WITH THIOPEPTIN AS RUMEN ADDITIVES, SH-225

| TREATMENT | DRUG LEVEL molar % | VFA, molar % acetate | VFA, molar % propionate | RATIO acetate/propionate | TOTAL VFA MM/L |
|---|---|---|---|---|---|
| Control | — | 70.3 | 20.0 | 3.6 | 83.5 |
| thiopeptin | 0.001 | 69.4 | 22.1 | 3.3 | 75.2 |
|  | 0.002 | 67.4 | 23.6 | 2.8 | 72.4 |
| pyromellitic diimide (PD) | 0.005 | 65.1 | 22.2 | 3.0 | 80.0 |
| PD + thiopeptin | 0.005 + 0.001 | 58.4$^a$ | 31.3$^a$ | 1.9$^a$ | 69.1 |
|  | 0.005 + 0.002 | 59.1$^a$ | 32.3$^a$ | 1.9$^a$ | 68.4 |
| N—(2-hydroxyethyl)pyromellitic diimide (HEPD) | 0.0025 | 69.9 | 19.3 | 3.7 | 77.4 |
|  | 0.0025 | 65.6$^b$ | 25.1$^b$ | 2.7$^b$ | 79.1 |
| HEPD + thiopeptin | 0.0025 + 0.001 | 66.8 | 24.3$^b$ | 2.8$^b$ | 82.8 |
|  | 0.0025 + 0.002 |  |  |  |  |
| HEPD | 0.005 | 67.2 | 20.4 | 3.4 | 74.4 |
| HEPD + thiopeptin | 0.005 + 0.001 | 61.7$^c$ | 28.3$^c$ | 2.2$^c$ | 80.3 |
|  | 0.005 + 0.002 | 60.6$^c$ | 30.7$^c$ | 2.0$^c$ | 84.4 |

$^a$Significantly (P < 0.05) different from the value in the same column for PD fed alone.
$^b$Significantly (P < 0.05) different from the value in the same column for HEPD fed alone at 0.0025% of diet.
$^c$Significantly (P < 0.05) different from the value in the same column for HEPD fed alone at 0.005% of diet.

What is claimed is:

1. An orally administered synergistic combination useful for increasing the feed efficiency of ruminants which comprises a finished feed product and a synergistic combination of from 0.0001% to 0.01% by weight of thiopeptin with from 0.0001% to 0.02% by weight of a pyromellitic diimide compound selected from the group consisting of
    (a) pyromellitic diimide;
    (b) (N-(2-hydroxyethyl)pyromellitic diimide; and
    (c) N,N'-bis-(2-hydroxyethyl)pyromellitic diimide.

2. The synergistic composition of claim 1 wherein the composition is a finished feed product containing from 0.0005% to 0.002% by weight of the sulfur-containing cyclic polypeptide antibiotic and from 0.0015% to 0.015% by weight of the pyromellitic diimide.

3. A method for synergistically increasing the feed efficiency of ruminant animals which comprises orally administering to the ruminant animal, its feed containing an effective amount of a synergistic combination of from 0.0001 to 0.01% by weight of thiopeptin and from 0.0001 to 0.02% by weight of a pyromellitic diimide compound selected from the group consisting of
    (a) pyromellitic diimide;
    (b) N-(2-hydroxyethyl)pyromellitic diimide; and
    (c) N,N'-bis-(2-hydroxyethyl)pyromellitic diimide.

4. The synergistic method of claim 3 wherein the feed contains from 0.0005% to 0.002% by weight of the thiopeptin and from 0.001% to 0.003% by weight of the substituted pyromellitic diimide.

* * * * *

UNITED STATES PATENT AND TRADEMARK OFFICE
CERTIFICATE OF CORRECTION

PATENT NO. : 4,393,046

DATED : July 12, 1983

INVENTOR(S) : FRANCIS P. BAYLIS et al.

It is certified that error appears in the above—identified patent and that said Letters Patent is hereby corrected as shown below:

TABLE III
MEAN RUMINAL PARAMETERS OF SHEEP FED PYROMELLITIC DIIMIDE DERIVATIVES IN COMBINATION WITH THIOPEPTIN AS RUMEN ADDITIVES, SH-225

| TREATMENT | DRUG LEVEL | VFA acetate | molar% propionate | RATIO acetate/ propionate | TOTAL VFA MM/L |
|---|---|---|---|---|---|
| Control | - | 70.3 | 20.0 | 3.6 | 83.5 |
| thiopeptin | 0.001 | 69.4 | 22.1 | 3.3 | 75.2 |
|  | 0.002 | 67.4 | 23.6 | 2.8 | 72.4 |
| pyromellitic diimide (PD) | 0.005 | 65.1 | 22.2 | 3.0 | 80.0 |
| PD + thiopeptin | 0.005+0.001 | 58.4[a] | 31.3[a] | 1.9[a] | 69.1 |
|  | 0.005+0.002 | 59.1[a] | 32.3[a] | 1.9[a] | 68.4 |
| N-(2-hydraxy ethyl)pyramellitic diimide (HEPD) | 0.0025 | 69.9 | 19.3 | 3.7 | 77.4 |

UNITED STATES PATENT AND TRADEMARK OFFICE
CERTIFICATE OF CORRECTION

PATENT NO. : 4,393,046
DATED : July 12, 1983
INVENTOR(S) : FRANCIS P. BAYLIS et al.

It is certified that error appears in the above—identified patent and that said Letters Patent is hereby corrected as shown below:

TABLE III

| TREATMENT | DRUG LEVEL | VFA acetate | molar% propionate | RATIO acetate/ propionate | TOTAL VFA MM/L |
|---|---|---|---|---|---|
| HEPD + thiopeptin | 0.0025+0.001 0.0025+0.002 | 65.6[b] 66.8 | 25.1[b] 24.3[b] | 2.7[b] 2.8[b] | 79.1 82.8 |
| HEPD | 0.005 | 67.2 | 20.4 | 3.4 | 74.4 |
| HEPD + thiopeptin | 0.005+0.001 0.005+0.002 | 61.7[c] 60.6[c] | 28.3[c] 30.7[c] | 2.2[c] 2.0[c] | 80.3 84.4 |

[a] Significantly ($P < 0.05$) different from the value in the same column for PD fed alone.

[b] Significantly ($P < 0.05$) different from the value in the same column for HEPD fed alone at 0.0025% of diet.

[c] Significantly ($P < 0.05$) different from the value in the same column for HEPD fed alone at 0.005% of diet.

Signed and Sealed this

Twenty-fifth Day of October 1983

[SEAL]

Attest:

GERALD J. MOSSINGHOFF

Attesting Officer    Commissioner of Patents and Trademarks